D. OKHUIZEN.
EXTENSOMETER.
APPLICATION FILED MAR. 9, 1914.
1,214,708.
Patented Feb. 6, 1917.
2 SHEETS—SHEET 2.
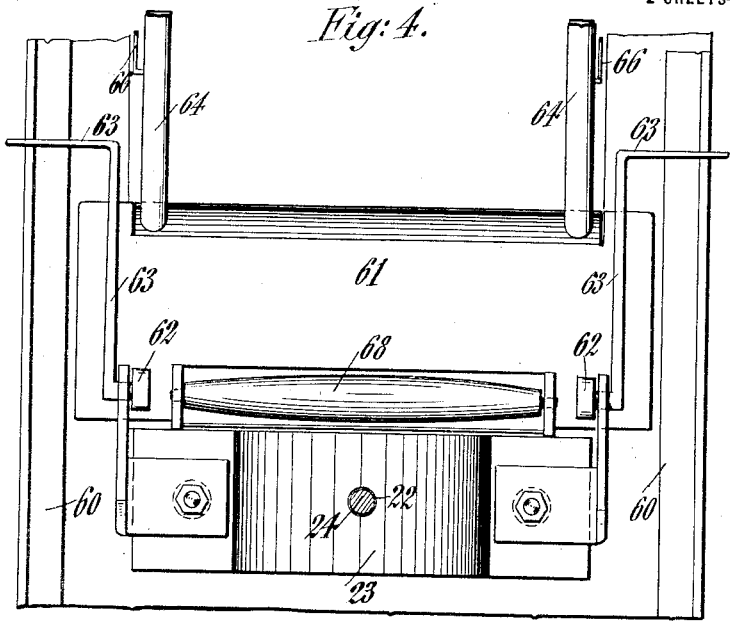
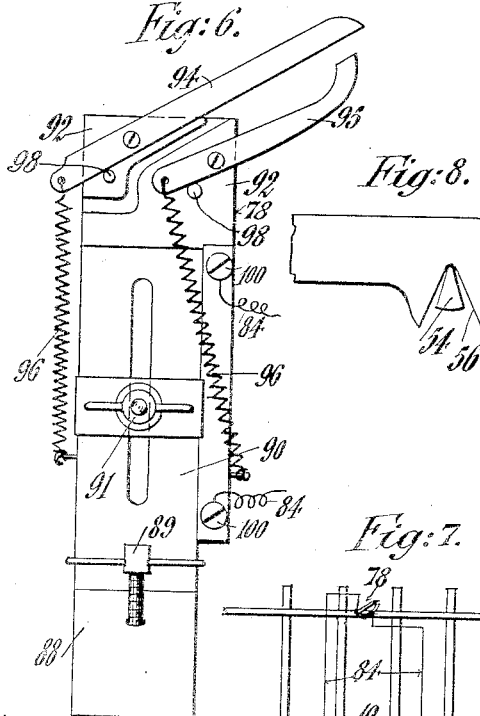
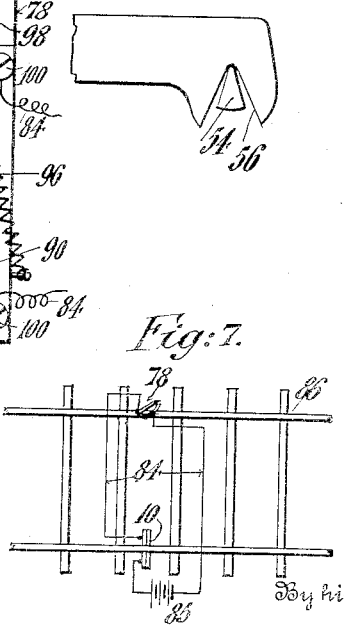
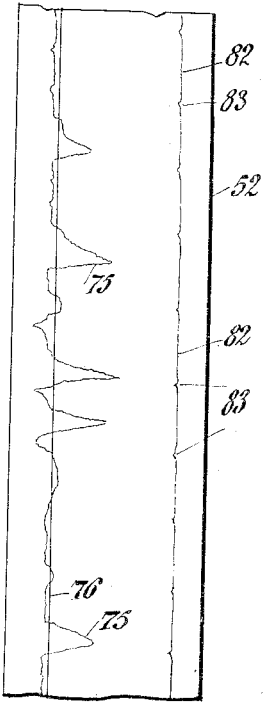
Witnesses:
H. M. Kilpatrick
John N. Hoving
Inventor
DIRK OKHUIZEN
By his Attorney
H. Van Deseunel

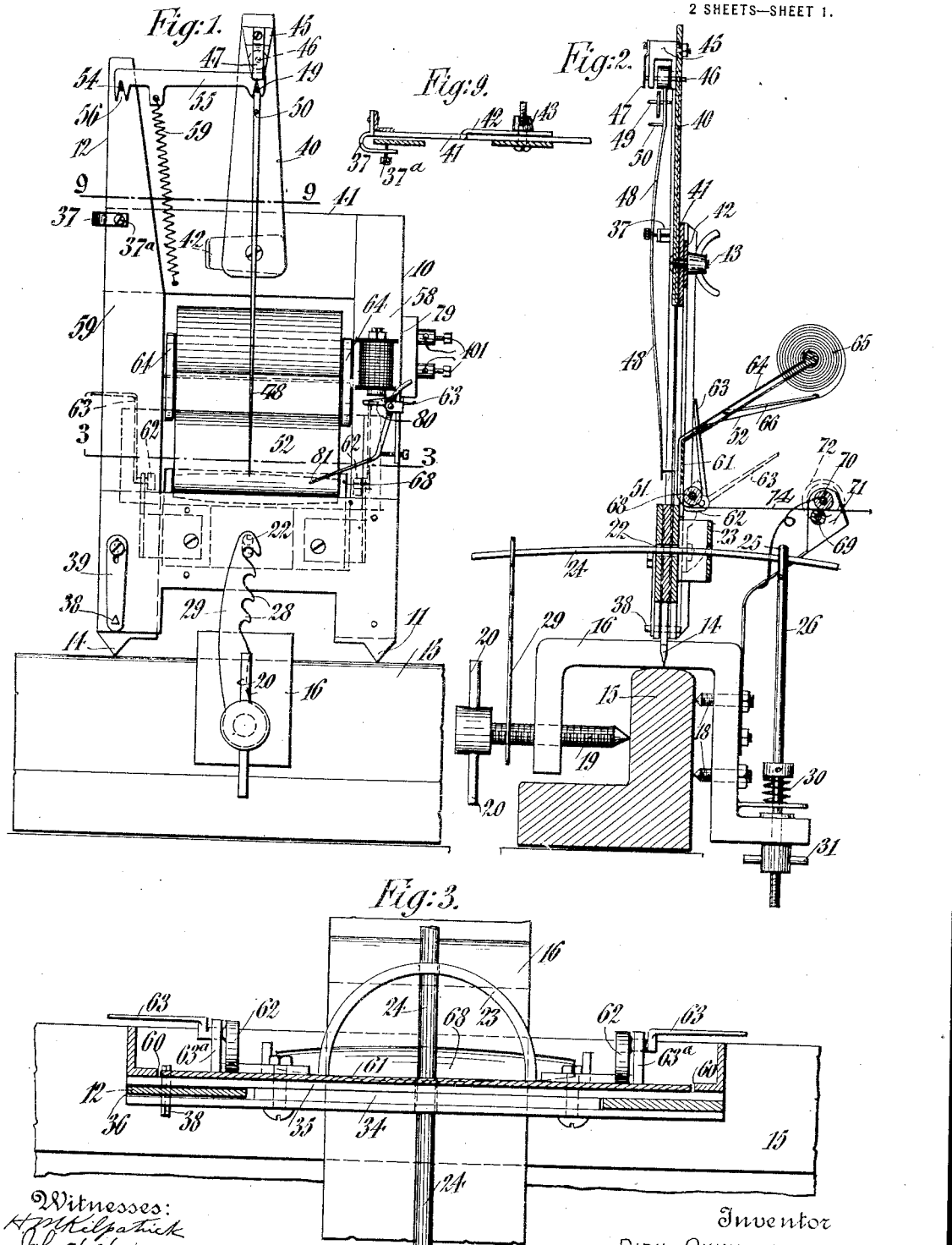

UNITED STATES PATENT OFFICE.

DIRK OKHUIZEN, OF THE HAGUE, NETHERLANDS, ASSIGNOR OF ONE-HALF TO RUDOLPH WELCKER, OF SPRINGFIELD, MASSACHUSETTS.

EXTENSOMETER.

1,214,708.  Specification of Letters Patent.  Patented Feb. 6, 1917.

Application filed March 9, 1914. Serial No. 823,448.

*To all whom it may concern:*

Be it known that I, DIRK OKHUIZEN, a subject of the Queen of the Netherlands, residing at The Hague, in the Netherlands, have invented a new and useful Improvement in Extensometers; and I do hereby declare the following to be a full, clear, and exact description of the same.

This invention relates to extensometers or strainmeters for measuring distortions, extensions, compressions or other strains that may take place in steel and other structures, ships in the high seas, machines and the like, under normal, abnormal or varying conditions of load or other influences.

While it is true that extensometers are well known, no instrument heretofore known measures all of the stresses resulting from continuous and varying conditions of loading during a certain period; and no device heretofore known shows the conditions of stress and load simultaneously.

The device is particularly useful for recording and studying varying conditions of stress and strain in railroad tracks and bridges when trains pass thereover; in steel constructions under load and wind pressure, and in machines and engines under various conditions of load and indicated motive power. The uses to which the device may be put are too numerous to attempt to catalogue them.

The herein described invention provides a device of this kind which is self contained, efficient, accurate and durable in service, easily manipulated and economically manufactured.

In the accompanying drawing showing, by way of example, one of many possible embodiments of the invention: Figure 1 is a front elevation of the extensometer; Fig. 2 shows a substantially central longitudinal section of the same, partly in elevation; Fig. 3 is a sectional view taken on the line 3 ... 3 of Fig. 1; Fig. 4 is a fragmental rear elevation on an enlarged scale; Fig. 5 shows a record tape as recorded by the device; Fig. 6 is a side elevation of a switch adapted to be closed by a passing train or the like, for controlling a suitable recording device on the extensometer; Fig. 7 shows a diagrammatic plan of a complete extensometer set applied to the flanges of a railroad rail; and Fig. 8 is an enlarged view showing the shape of the particular surfaces between pivoted parts of the extensometer. Fig. 9 is a fragmental sectional view, partly in plan, taken on the line 9 ... 9 of Fig. 1, parts being omitted.

Referring first to Figs. 1 to 4, the extensometer comprises a frame 10 having a point 11, and on which is pivoted a lever 12 also provided with a point 14. The points 11 and 14 are adapted to bite into the structure of which the strain is to be measured, and the extensometer is here shown applied to the flange 15 of an angle rail or the like, and is adapted to measure any variation in length of that part of the material lying directly between the points 11 and 14.

In order to secure the extensometer to the flange, I provide a clamp frame 16 provided on one side with a plurality of adjustable biting points 18 and on the other with a pointed screw 19 having a manipulating piece 20. By means of these points and screw, the frame 16 can be firmly fastened to the flange.

The lower cross-piece 21 of the extensometer frame is provided with a perforation 22 and a perforated rear bracket 23 through which is passed a spring needle 24 which is engaged at one end by the eye 25 of an adjustable pin 26, and at the other end by any one of a plurality of hooks 28 on the hook plate 29 pivoted on the screw pointed screw 19. The pin 26 passes through a small bore in the clamping frame 16 and is adjusted therein, against the action of the spring 30, by means of a thumb nut 31. By properly selecting the hook 28 and then tightening the thumb nut 31, the extensometer can be securely fixed to the flange 15 or other structure.

The lower cross-piece 21 of the extensometer frame comprises an inner plate 34 which is shorter than the two outer plates 35 secured thereto, whereby is provided a space 36 for the reception of the lever 12. Through the ends of the outer plate 35 and the lever 12 is passed a pin 38 whereby the lever is pivoted between said outer plate. The pin 38 is held in place by a spring plate 39 secured to the frame 10. A small bracket 37 with adjustable set-screw 37ª prevents excessive side play of the lever 12.

A standard 40 is adjustably clamped on the upper cross-piece 41 of the extensometer frame between a spring clamp 42 and said cross-piece by means of a set-screw 43 having a thumb-nut 44. At the upper end of this bracket is secured a bifurcated block 45 through the members of which is passed a pivot pin 46 held in place by the spring 47 and on which is pivotally mounted the pointer 48 carrying near its upper end two pins 49 and 50 and carrying at its lower end a stylus 51 of soft metal such as Berlin silver, copper or the like and adapted to make a mark on the metallized-paper tape 52.

The upper end of the lever 12 is provided with a pin 54 which is connected to the pin 49 or 50 by means of a link 55 having at its ends inverted V-shaped notches 56 and 57 receiving said pins. The notches are held in operative engagement with the pins by the action of the spring 59 which tends to draw the link 55 downwardly.

While the articular surfaces between the pins 38, 49, 50 and 54 and the parts articulating therewith may be of any suitable shape, that shown in Fig. 8, which shows the pin 54 and notch 56 has been found very efficient.

The backs of the side pieces 58 and 59 of the extensometer frame 10 are formed with vertical shoulders 60. Between these shoulders and resting on the bracket 23 is disposed the writing table 61 held in place by pivoted cam-clips 62 having suitable manipulating fingers 63 and pivoted in brackets 63ª mounted upon the side pieces.

The upper portion of the table is bent backwardly and has mounted thereon two arms 64 carrying a roll of the metallized paper tape 52. From this roll the tape is fed passing a guide 66, mounted on said arms, and is passed over the table 61, under a roller 68, and out between the feed rollers 69 and 70 mounted on a support 71 carried on the clamping frame 16. One of these rollers, for instance the roller 70 may be provided with a groove pulley 72 adapted to receive a driving chain 74 or other flexible member, which when around said pulley may be drawn out, thereby revolving the rollers 69 and 70, thus drawing the tape across the table. Instead of the pulley 72 other suitable driving means, for instance clock work, may be used, or the tape may be simply pulled out by hand.

The operation of the extensometer alone may be as follows, though many variations in the operations are obvious: The roll of tape 52 is put in place and the tape fed over the table 61, under the roller 68 and between the rollers 69 and 70. The standard 40 is then adjusted to bring the stylus 51 to the middle line of the paper, or to the most convenient line, depending upon the nature of the expected record. The clamp frame 16 is then secured to the structure to be observed and the extensometer secured thereto, all as explained above and illustrated in Fig. 2. During the strain to be observed, the tape 52 is drawn, as explained above, with substantially uniform speed across the writing table and the stylus 51 inscribes thereon a record-line, of which the line 75 shown in Fig. 5 is an example. A base or zero line 76 may be determined, if desired, by drawing the tape across the writing table when no operating stress is expected on the points 11 and 14. The distances from the point 14 to the pin 38, the pin 38 to the pin 54, the pin 46 to the pin 49 or 50 and the pins 49 or 50 to the stylus 51 may be other than as shown and are so selected that in accordance with the modulus of elasticity of the test material, the scale of record will have a simple relation to the stresses per square unit. If by placing the notch 57 upon the pin 49, the observed strain throws the stylus off the tape, this notch is placed upon the pin 50, so that the movement of the point 14 is multiplied in the stylus to a less extent. On the other hand, if by placing the notch 57 upon the pin 50, the variation in the line 75 is not great enough to be easily read, the notch is placed upon the pin 49. In practice it has been found convenient to place the pin 50 twice the distance of the pin 49 from the pin 46.

In studying the action of passing locomotives, cars and the like over railroad rails, it is desirable to have indicated upon the record tape, the instant of the passage of each wheel. To this end I have provided an arrangement by which a switch 78 is closed by the passing wheel, which closes an electric circuit through an electromagnet 79 mounted on the extensometer, which magnet actuates an armature 80 carrying a scriber 81, which normally inscribes a straight line upon the moving tape 52 but which is changed to a V-shaped notch as at 83 (Fig. 5) on each actuation of the switch 78 by the wheel. This arrangement is shown diagrammatically in Fig. 7 in which the switch 78 is connected, by conductors 84 in series with a battery 85 and two extensometers 10 secured to the flanges of one rail of a railroad track 86.

It may be found desirable to connect in circuit extensometers on one or both flanges of one or both rails of the track in one or more places on the flange, so that simultaneous readings may be taken of the different variations in different parts of different flanges of different rails.

The switch 78 may be of any convenient form, for instance, as shown in Fig. 6, in which the switch comprises a base portion 88 adapted to be clamped upon the rail flange by means of the screw 89, and a standard adjustably held upon the base portion by means of a screw 91. Upon the standard 90 are secured insulating blocks 92 upon which are pivoted contact arms 93 and 94 yieldably held, by springs 96 in the upper position shown in which position the arms are held against stops 98 which limit their pivotal movement. The arms 94 and 95 are connected by suitable conductors 99 to binding posts 100 to which are in turn connected the conductors 84. The electromagnet 79 is connected in circuit by means of the binding posts 101. The switch 78 is placed on the rail with the arms 94 and 95 pointing in the direction of travel of the passing wheel, the wheel presses the arm 94 against the arm 95 closing the electric circuit and indicating the instant of the passage of the wheel by the notch 83 in the line 82. The springs 96 permit both arms to lower sufficiently for the passage of the wheel, whereby contact is always secured by the passage of the wheel but breakage of the arms is prevented.

I claim as my invention:—

1. In an extensometer, a frame having a single biting point; a lever fulcrumed to the frame and having a single biting point; a stylus; a recording means for carrying tape past the stylus; an operative connection between the stylus and the lever; a clamp; and a resilient connection between the clamp and frame.

2. In an extensometer, the combination of a frame having a fixed biting point; a lever pivoted to the frame and provided with a biting point; a table on the frame; means for feeding tape on the table; a stylus for marking on the tape; an operative connection between the lever and the stylus; a clamping device; and a resilient connection between said clamp and frame.

3. In an extensometer, the combination of a frame having a fixed biting point; a lever pivoted to the frame and provided with a biting point; a table on the frame; means for feeding tape on the table; a stylus for marking on the tape; a multiplying operative connection between the lever and the stylus; a clamp; and a resilient connection between said clamp and frame.

4. In an extensometer, the combination of a frame having a biting point thereon; a lever pivoted to the frame and also having a biting point; a writing table on the frame; means for feeding a tape across the writing table; a standard adjustably mounted on the frame; a pointer pivotally mounted on the standard and adapted to mark on said tape; and a link connecting said lever and pointer.

5. In an extensometer, the combination of a frame having a fixed part; a table; a pointer pivoted in said frame over said table and provided with a pair of pins; a movable part in said frame associated with the fixed part; and a link operatively connected to the fixed part and having a notch adapted to engage one of said pins.

6. In an extensometer, the combination of a frame having a fixed part thereon; a table thereon; a pointer over the table; a lever having pivoted connection with the frame and provided with a movable part associated with said fixed part; and a link having pivotal connections with the lever and the pointer.

7. In an extensometer, the combination, of a frame having a fixed part thereon; a table thereon; a pointer over the table; a lever having pivoted connection with the frame and provided with a movable part associated with said fixed part; and a link having pivoted connections with the lever and the pointer, one of said connections comprising a pin having a rounded wedge shaped portion, and a notch receiving said portion.

8. In an extensometer, the combination of a frame having a fixed part thereon; a table thereon; a pointer over the table; a lever having pivoted connection with the frame and provided with a movable part associated with said fixed part; and a link having pivoted connections with the lever and the pointer, said connections each comprising a pin having a rounded wedge shaped portion, and a notch receiving said portion.

9. In an extensometer, the combination of a frame having a fixed biting point; a lever pivotally mounted thereon and provided with a movable biting point; a bearing pin on said lever; an adjustable standard on said frame; a pointer pivoted on said standard and provided with a stylus at its free end and a pair of bearing pins near its pivoted ends; a spring pressed link having notches engaging the bearing pins of said lever and adapted to engage either bearing pin of the pointer; a writing table opposite to said stylus; a roll holder supporter near said table from which tape may be fed to the table; a guide roller under said table under which the tape may be passed; a pair of feed rollers supported to the rear of the guide roller; means for rotating the feed rollers; and means for attaching said frame to a structure so said points bite into the material thereof.

10. In combination, a clamping device; an extensometer; and resilient means connecting the extensometer to the clamping device.

11. In combination, an extensometer provided with a pair of alined perforations; a spring needle passed through said perforations; a clamping device adapted to be secured to a structure; and means for connecting opposite ends of said needle to the clamping member.

12. In combination, an extensometer having a cross-piece and a bracket thereon respectively provided with alined perforations; a clamping frame provided with relatively adjustable sharpened points by which the frame may be clamped to a structure; a spring needle in said alined perforations; a screw eye receiving said needle and adjustably secured to said frame; and a hook member connected to said frame and provided with a plurality of hooks adapted to engage said needle.

In testimony whereof, I have signed my name to this specification in the presence of two subscribing witnesses.

DIRK OKHUIZEN.

Witnesses:
HENDRIK ROELOF CAMBIER,
JOHAN WILHELM MATHOL.